Patented Dec. 25, 1945

2,391,619

UNITED STATES PATENT OFFICE 2,391,619

METHOD OF FORMING COMPOSITE MATERIALS

Arthur K. Doolittle, South Charleston, W. Va., assignor to Carbide and Carbon Chemicals Corporation, a corporation of New York No Drawing. Application August 1, 1940,
Serial No. 349,235

6 Claims. (Cl. 117—65)

This invention is an improved method of forming composite materials which comprise fibrous bases coated with thermoplastic substances of resinous or macromolecular nature. A feature of the method is the improvement of the appearance, adhesion and imperviousness of the thermoplastic coating by means of a thermal treatment, all as more fully hereinafter described.

The application of coatings to both printed and plain paper and similar fibrous materials for the purpose of protection or decoration has been practiced for many years. Coatings used for this purpose have included spirit varnishes, oil base varnishes, alkyd and phenolic resin varnishes, lacquers containing depolymerized and chlorinated rubber, and lacquers containing certain cellulose esters and ethers, such as nitrocellulose and ethyl cellulose. In practice, these varnishes and lacquers usually have been applied to the fibrous base by various devices, and the coated product has then been force dried at temperatures of from about 125° F. (52° C.) up to about 250° F. (121° C.). This force drying period (usually from 30 seconds to several minutes) serves to eliminate solvents from the coating in the case of lacquers and spirit varnishes, and to convert the coating material to a hard and insoluble modification in the case of thermosetting resins and heat-reactive varnishes.

Vinyl resins, such as those of the type formed by the conjoint polymerization of vinyl halides with vinyl esters of the lower aliphatic acids, are inherently colorless materials which have great resistance to chemical attack and to moisture. For these reasons, the vinyl resins are unusually desirable for use in protective and decorative coatings. I have attempted to adapt these vinyl resins to the coating of fibrous bases by the methods usual with other coatings but without success. On some materials, such as many common grades of non-porous paper, especially the hydrated type known as glassine, the vinyl resin coatings failed to adhere sufficiently, while on those grades of paper of sufficient porosity to provide adequate anchorage for the resin, the coatings produced were of poor appearance and the absorption of resin by the paper was excessive. Moreover, the usual coating procedures were not capable of causing the vinyl resin to adhere to paper or the like bearing printed matter even in the case of relatively porous materials.

The main object of this invention is to overcome the difficulties set forth, and to provide a simple and effective method of forming composite materials in which paper and similar fibrous materials are combined with thermoplastic vinyl resins and related plastic substances in the form of adherent, impervious coatings of good appearance.

I have found by experiment that the object stated can be attained and that firmly adherent and impervious coatings of vinyl resins can be formed on paper and similar fibrous bases by subjecting the coated material to a flash baking operation at high temperatures for a very short time. This operation produces coatings which are glossy in appearance and have an excellent depth and brilliance. The temperatures ordinarily used are in the neighborhood of 375° to 400° F. (190° to 205° C.) and the time of exposure of the coating to these temperatures is usually about 5 to 20 seconds. A glossy finish may be imparted to a vinyl resin film which is deposited on paper in an extremely thin film from a solution of the vinyl resin, and the solvents thereafter eliminated by drying at ordinary temperatures, by subjecting the film to temperatures between 375° to 400° F. for a brief glossing period which is less than 30 seconds. The process is applicable not only to vinyl resins but also to other thermoplastic coating materials which are capable of withstanding the temperatures required. For example, coatings of depolymerized rubber and rubber hydrochlorides and ethyl cellulose also may be improved by this process. Although these latter materials have adequate adhesion when applied by previously known methods, their treatment according to this invention results in greater gloss and greater depth and brilliance in the appearance of the coating.

Some types of paper may become brittle if subjected to the high temperatures required in this process. This, and other adverse effects on the fibrous base may largely be prevented by carrying out the baking operation in a humidified atmosphere, or by rehumidifying the coated paper after baking.

The process of this invention is principally concerned with the improvement of those materials which include a coating of vinyl resin, and it is especially desirable in the treatment of coatings of vinyl resins which may result from the conjoint polymerization of vinyl halides, such as vinyl chloride, with vinyl esters of the lower aliphatic acids, such as vinyl acetate, vinyl propionate and vinyl butyrate. Preferred types of vinyl resins for this purpose are conjoint polymers of vinyl chloride with vinyl acetate which contain about 80% to 95% vinyl chloride and which possess average molecular weights of from about 9,000 to about 13,000, as determined from the specific viscosity of dilute solutions of the resin according to Staudinger's method. These resins may be present in the composite materials as a coating on one or both sides of the base material in thicknesses of from 0.0001 to 0.002 inch. Very thin coatings are usually entirely satisfactory. I have found that printed labels coated with 0.0001 inch of vinyl resin which had been baked at 380° F. (193° C.) for 10 seconds had an equal gloss and were superior in most respects to the same labels when coated with 0.0002 inch of nitrocellulose and force dried at 200° F. (93° C.) in the usual manner.

Another embodiment of the invention besides the coating of labels is in applying a protective film to gelatinized, highly hydrated papers of the glassine type which are characterized by a smooth, non-porous surface. Heretofore it has been difficult, if not impossible, to form an adherent coating of a vinyl resin on glassine paper. By means of this invention, an adherent vinyl resin film may be formed on glassine paper by coating the paper with a solution of the vinyl resin and flash baking the coating at temperatures between 375° and 400° F. (190° to 205° C.). The exact length of the baking operation will depend on the temperature used but, in general, it should not exceed 20 seconds. Somewhat shorter times of flash baking may be employed if the coating has previously been force dried according to the usual methods to remove the volatile solvents from the coating.

Vinyl resin coatings on glassine paper which have been formed in this manner provide increased resistance to moisture in the paper and impart to the product greater imperviousness to grease and many chemicals. The vinyl resin coating adheres in such a tenacious manner that it cannot be separated from the glassine paper and the resistance of the glassine paper to tearing or creasing is greatly improved. Composite products of this type may be used as a thermoadhesive tape for sealing purposes as well as for the customary applications of glassine paper.

The essential feature of this invention which enables tough, adherent and glossy films of vinyl resin to be formed on a fibrous base by solution coating is the final flash baking of the coating at temperatures above 375° F. (190° C.) but below that at which the vinyl resin film becomes discolored. Thus, it was found that labels which had been coated with a vinyl resin coating and subsequently baked at temperatures of 340° F. (173° C.) possessed inferior resistance to abrasion and exhibited much less gloss than a similar set of labels which had been baked at a temperature of 400° F. (205° C.). The resistance of the latter product to moisture and to various chemicals was also greater. The time of exposure of the vinyl resin coated article to the extremely high temperatures must be brief or excessive softening of the vinyl resin, as well as its discoloration, may occur. The stability of the resin to discoloration on heating may be increased by its incorporation with known heat stabilizers, such as calcium salts, and organo-metallic compounds of tin and lead.

The following examples will serve to illustrate the invention in detail:

*Example 1*

A solution containing 11.5 parts by weight of the preferred type of conjoint polymer of vinyl chloride with vinyl acetate dissolved in 44.3 parts by weight of methyl isobutyl ketone and 44.2 parts by weight of toluene was sprayed on the surface of a relatively porous, uncoated paper stock (50 pound base). This coating presented a rough, unattractive surface, and it could be easily separated from the paper.

The coated paper, after air-drying, was then baked at 400° F. (205° C.) in a forced convection oven for a few seconds. The coating after this treatment displayed high gloss and an excellent depth and brilliance of appearance, and it adhered tenaciously to the paper.

*Example 2*

A coating composition of the following ingredients was prepared:

| | Parts by weight |
|---|---|
| Conjoint polymer of vinyl chloride with vinyl acetate, 87% to 88% vinyl chloride, average molecular weight about 10,000 | 12.50 |
| Conjoint polymer of vinyl chloride with vinyl acetate, 87% to 88% vinyl chloride, average molecular weight about 7,000 | 12.50 |
| Dibutyl phthalate | 2.50 |
| Methoxy ethylene glycol oleate | 3.75 |
| Methyl isobutyl ketone | 34.38 |
| Toluene | 34.37 |

A film of vinyl resin 0.00011 inch in thickness was deposited from this solution on labels printed on a highly calendered paper (50 pound base). Initially this film possessed little gloss. Upon passing the coated paper through an oven heated indirectly at 380° F. (193° C.), the coating exhibited the gloss, the depth, and the brilliance of a film several times as thick.

*Example 3*

A paper coating solution of the following composition was formulated:

| | Parts by weight |
|---|---|
| Conjoint polymer of vinyl chloride with vinyl acetate, 87% to 88% vinyl chloride, average molecular weight about 10,000 | 12.5 |
| Conjoint polymer of vinyl chloride with vinyl acetate, 87% to 88% vinyl chloride, average molecular weight about 7,000 | 12.5 |
| Methoxy ethylene glycol acetyl ricinoleate | 5.0 |
| Dibutyl phthalate | 0.5 |
| Methyl isobutyl ketone | 34.8 |
| Toluene | 34.7 |

A highly calendered paper was coated with a film of vinyl resin 0.0004 inch thick deposited from this solution by the use of a conventional coating machine. The coated paper was passed directly into a drying oven in which the temperature gradient through the oven was maintained between 200° F. (93° C.) and 350° F. (177° C.), a somewhat higher drying temperature than that normally used.

Several sheets of this coated paper were then flash baked in a forced convection oven, humidified with steam, for a period of 15 seconds at 400° F. (204° C.). This treatment not only increased the gloss and the adhesion of the vinyl resin film to the paper in a marked degree but also increased the resistance of the coated paper to transmission of moisture. This was shown by tests conducted at 35° C. on discs of the coated paper having saturated water vapor on the one side and an absolutely dry atmosphere on the other. The coated paper, before the thermal treatment at 400° F., transmitted moisture at the rate of 1.04 milligrams per hour per square centimeter, but, after the baking operation, it transmitted moisture at the rate of only 0.62 milligram per hour per square centimeter.

*Example 4*

A solution containing 25 parts by weight of the vinyl resin as described in Example 3 dissolved in 75 parts by weight of methyl isobutyl ketone was applied to uncoated glassine paper stock (25 lb. basis) by a conventional reverse roll paper coating machine. The coated paper then passed through a four compartment oven so that it received the following cycle of temperatures: compartment A, 140° F., compartment B, 260° F., compartment C, 410° F., compartment D, 240° F. A linear speed of 100 feet per minute gave a total exposure in the oven of 15 seconds.

The film of vinyl resin thus deposited and baked on the glassine paper was 0.00018 inch in thickness. Samples examined before baking exhibited poor adherence, but the coated glassine that was exposed to the 410° flash bake was firmly adherent and could not be removed without tearing the paper. This coated glassine showed a low moisture vapor transmission and excellent resistance to light mineral oil, butter, caustic alkali and mineral acid.

Example 5

The coating composition described in the previous example was applied to a highly calendered paper to form a film of vinyl resin 0.0003 inch thick. After baking the coated paper for 10 seconds at 400° F. (205° C.), it showed a decided increase in gloss and in resistance to penetration by mineral oil and by 20% sulfuric acid.

Example 6

A film of depolymerized rubber 0.0004 inch in thickness was applied to labels printed on a bleached sulfite paper in the customary manner and the product was initially of a dull appearance and lacked luster. Upon baking at 400° F. (205° C.) for periods ranging from 15 to 60 seconds, a somewhat larger period than required for treating vinyl resin coatings, the labels exhibited a brilliant appearance and a high gloss.

Example 7

A solution of low viscosity ethyl cellulose in a mixture of toluene and alcohol was applied by spraying to a porous, uncoated paper. The coating originally had a rough, unpleasing appearance, but, after baking for 120 seconds at 400° F. (205° C.), it exhibited a high luster and brilliant appearance.

Modifications of the invention other than as described in the foregoing examples will be apparent to those skilled in the art and are included within the scope of the invention as defined by the appended claims.

I claim:

1. A process for coating paper which comprises bringing only an extended surface of the paper in brief contact with a solution of a vinyl resin in a solvent therefor, drying the coated paper, and improving the adhesion of the coating to the paper and increasing its gloss, depth and brilliance; its resistance to abrasion; and its resistance to moisture, oils, fats, alkalies and acids by subjecting the coated paper to a baking operation in an enclosed space at temperatures between about 375° F. and 410° F. for a period not exceeding about 20 seconds and forming a film substantially consisting of the vinyl resin in a thickness of from about 0.0001 to 0.002 inch on the paper.

2. A process for coating printed labels which comprises bringing only an extended surface of the label in brief contact with a solution of a vinyl resin in a solvent therefor, drying the coated label, and improving the adhesion of the coating to the label and increasing its gloss, depth and brilliance; its resistance to abrasion; and its resistance to moisture, oils, fats, alkalies and acids by subjecting the coated label to a baking operation in an enclosed space at temperatures between about 375° F. and 410° F. for a period of from about 5 to about 20 seconds, and forming a film substantially consisting of the vinyl resin in a thickness of from about 0.0001 to about 0.0004 inch on the label, said vinyl resin being a conjoint polymer of vinyl chloride with vinyl acetate.

3. Process for coating paper which comprises depositing only on an extended surface of the paper an extremely thin film of vinyl resin from a solution thereof, eliminating solvents from the film of vinyl resin at ordinary drying temperatures and then imparting a glossy finish to said vinyl resin film and causing it to adhere to the paper by subjecting the coated paper in an enclosed space to temperatures between 375° F. and 400° F. for a period less than about 30 seconds, said vinyl resin being substantially identical with that resulting from the conjoint polymerization of vinyl chloride with vinyl acetate and containing about 80% to 95% by weight of vinyl chloride and having an average molecular weight between about 9,000 and 13,000.

4. A process for coating non-porous paper which comprises bringing only an extended surface of the paper in brief contact with a solution of a vinyl resin in a solvent therefor, drying the coated paper material and improving the adhesion of the coating to the paper and increasing its gloss, depth and brilliance; its resistance to abrasion; and its resistance to moisture, oils, fats, alkalies and acids by subjecting the coated paper to a baking operation in an enclosed space at temperatures between about 375° F. and 410° F. for a period not exceeding about 20 seconds, and forming a film substantially consisting of the vinyl resin in a thickness of from about 0.0001 to 0.002 inch on the paper.

5. A process for coating glassine paper which comprises bringing only an extended surface of the paper in brief contact with a solution of a vinyl resin in a solvent therefor, drying the coated paper and improving the adhesion of the coating to the paper, and increasing its gloss, depth and brilliance; it resistance to abrasion; and its resistance to moisture, oils, fats, alkalies and acids by subjecting the coated paper to a baking operation in an enclosed space at temperatures between about 375° F. and 410° F. for a period not exceeding about 20 seconds and forming a film substantially consisting of the vinyl resin of a thickness of from about 0.0001 to 0.002 inch on the glassine paper, said vinyl resin being a conjoint polymer of vinyl chloride with vinyl acetate.

6. A process for coating fibrous base materials which comprises bringing only an extended surface of the fibrous base in brief contact with a solution of a vinyl resin in a solvent therefor, drying the coated base material, and improving the adhesion of the coating to the base material and increasing its gloss, depth and brilliance; its resistance to abrasion; and its resistance to moisture, oils, fats, alkalies and acids by subjecting the coated material to a baking operation in an enclosed space at temperatures between about 375° F. and 410° F. for a period not exceeding about 20 seconds, and forming a film substantially consisting of the vinyl resin in a thickness of from about 0.0001 to 0.002 inch on the base material, and thereafter subjecting the coated material to a humid atmosphere.

ARTHUR K. DOOLITTLE.